United States Patent [19]
Oxford et al.

[11] 3,873,538
[45] Mar. 25, 1975

[54] AMINO-9,10-DIHYDRO-9,10-DIOXO-2-ANTHROIC ACIDS

[75] Inventors: Alexander William Oxford; Geoffrey Edward Gymer, both of London, England

[73] Assignee: Allen & Hansburys Limited, London, England

[22] Filed: July 19, 1971

[21] Appl. No.: 164,093

[30] Foreign Application Priority Data
Aug. 5, 1970 United Kingdom........... 37724/70
Aug. 5, 1970 United Kingdom........... 37725/70

[52] U.S. Cl............... 260/247.2 R, 260/247.2 B, 260/268 TR, 260/272, 260/376, 424/248, 424/250, 424/267, 424/319

[51] Int. Cl.. C07d 29/24, C07d 51/70, C07d 87/36

[58] Field of Search....... 260/376, 268 TR, 247.2 B, 260/247.2 R, 293.62, 272

[56] References Cited
UNITED STATES PATENTS

| | | | |
|---|---|---|---|
| 1,915,334 | 6/1933 | Salzberg et al. | 260/243 |
| 2,075,359 | 3/1937 | Salzberg et al. | 260/293.51 |
| 2,195,974 | 4/1940 | Reppe et al. | 260/376 |
| 2,362,614 | 11/1944 | Calva | 424/325 |
| 2,852,534 | 9/1958 | Klinsberg | 260/376 |
| 3,089,879 | 5/1963 | Serres, Jr. et al. | 260/376 |

OTHER PUBLICATIONS

N. S. Dokunikhin et al., Chemical Abstracts, Vol. 57, p. 8516 g, (1961).
N. S. Dokunikhin et al., Chemical Abstracts, Vol. 64, pages 15797–15798, (1964).

*Primary Examiner*—Alton D. Rollins
*Assistant Examiner*—Jose Tovar
*Attorney, Agent, or Firm*—Bacon & Thomas

[57] ABSTRACT

Anthraquinone derivatives of the general formula I:

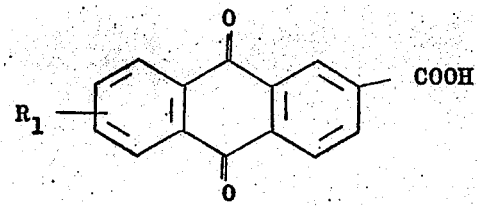

and pharmaceutically acceptable salts and esters thereof,
wherein $R_1$ represents a halogen atom, a hydroxyl group or a group $-OR_2$, (in which $R_2$ may be a lower alkyl group containing from 1 to 6 carbon atoms optionally substituted by a hydroxy group, an aryl group, an aryloxy group, an alkoxy group or a dialkylamino group) or a group $-NR_3R_4$, (in which $R_3$ and $R_4$ which may be the same or different, represent a hydrogen atom, a lower alkyl group containing from 1 to 6 carbon atoms, optionally substituted by a hydroxy group, or $R_3$ and $R_4$ together with the nitrogen atom may form a ring which may optionally be substituted with another heteroatom); with the proviso that when $R_1$ is a halogen atom or a methoxy group mixtures of positional isomers produced by existing chemical processes are excluded.

12 Claims, No Drawings

AMINO-9,10-DIHYDRO-9,10-DIOXO-2-ANTHROIC ACIDS

This invention relates to novel anthraquinone derivatives, to processes for the preparation thereof and to compositions containing such derivatives.

We have found that certain novel anthraquinone derivatives have useful immunological activities and in particular inhibit the release of spasmogens that normally occurs when a reaginic antibody combines with an antigen.

The present invention accordingly provides anthraquinone derivatives of general formula I:

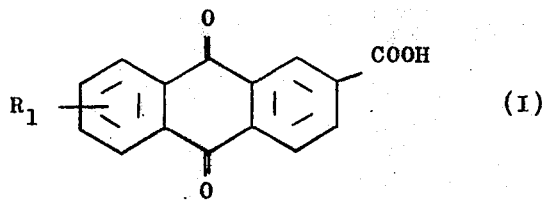

wherein $R_1$ represents a halogen atom, a hydroxyl group or a group $-OR_2$, in which $R_2$ may be a lower alkyl group containing from 1 to 6 carbon atoms, preferably 1 to 4 carbon atoms optionally substituted by a hydroxy group, an aryl group, an aryloxy group, an alkoxy group or a dialkylamino group. $R_1$ may also represent the group $-NR_3R_4$, in which $R_3$ and $R_4$, which may be the same or different, represent a hydrogen atom or a lower alkyl group containing from 1 to 6 carbon atoms, preferably 1 to 4 carbon atoms optionally substituted by a hydroxy group, or $R_3$ and $R_4$ together with the nitrogen atom may form a ring which may optionally be substituted by another heteroatom, e.g. piperidino, morpholino or N-methylpiperazino, with the proviso that when $R_1$ is a halogen atom or a methoxy group the invention does not extend to mixtures of positional isomers produced by existing chemical processes.

The production of compounds in which $R_1$ represents a halogen atom or a methoxy group has been described but by a process which we have ascertained leads to a mixture of two isomers. The present invention provides inter alia as described below a process which results in the production of selected isomers in substantially pure form. It is believed that the compounds in which $R_1$ represents a halogen atom or a methoxy group are novel when in the form of substantially pure isomers.

The invention also includes salts, for example those with alkali metals such as sodium, with organic bases such as dimethylaminoethanol, and with mineral and organic acids, as well as esters of the carboxylic acids, such as simple alkyl esters and those described in the Examples.

The compounds according to the invention have the property of inhibiting the release of spasmogen mediators in the antigen-antibody reaction. Thus, for example, 9,10-dihydro-7-(2-hydroxyethoxy)-9,10-dioxo-2-anthoic acid has been found to be about 20 times as active as disodium cromoglycate in inhibiting the passive cutaneous anaphylaxis (PCA) reaction in the rat using the nematode *Nippostrongylis brasiliensis* as the antigen (Ogilvie, Brit. J. Immunol., 1967, 12 (2) 113–131).

The use of the compounds is therefore indicated in the treatment of any condition in which an extrinsic antigen combination with antibody is primarily responsible, as, for example, in allergic asthma, hay fever, urticaria, eczema, or atopic dermatitis.

Preferred compounds according to the invention are those the preparation of which is described in the Examples.

The invention further provides pharmaceutical compositions comprising a compound according to the invention in association with a pharmaceutically acceptable carrier.

The compounds according to the invention, may be formulated for use as pharmaceutical compositions in the conventional manner with the aid of carriers or excipients and formulatory agents as required and with or without supplementary medicinal agents. Oral administration is most convenient in the form of tablets which may be coated, pastes, aqueous or oily suspensions, solutions, emulsions, or capsules. Carriers include inert diluents such as calcium carbonate and/or disintegrating agents such as alginic acid or starch. Magnesium stearate may be used as a lubricating agent and flavouring or sweetening agents include sucrose, dextrose, glucose, gylcerol etc. For emulsions suspending agents such as sodium carboxymethyl cellulose may be used. Injections may be formulated with the aid of physiologically acceptable carriers and agents as solutions, or as dry products for reconstitution before use. For administration by inhalation the compositions according to the invention may conveniently be in the form of an aerosol spray presentation including both pressurised cans and nebulisers. The dosage at which the active ingredient is administered may vary within a wide range. A suitable oral dosage range is generally from 5 to 1500 mg. The pharmaceutical compositions may, with advantage, be formulated to provide a dose within this range either as a single unit or a number of units. In the use of an aerosol the dosage unit may be determined by providing a metering valve in the aerosol pack so that it delivers a metered amount on use. Such a metered amount may be of the order of 1–10 mg. The compositions may be presented in combination with a bronchodilator as required.

The compounds of the present invention may be prepared by a method which involves oxidation of an anthrone carboxylic acid of the formula II:

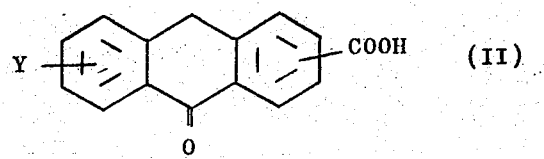

in which Y may be halogen, in particular chloro or fluoro. This oxidation is preferably effected with an oxidising agent such as chromic acid. The anthrone carboxylic acid itself can be prepared by the cyclisation of an appropriate terephthalic or isophthalic acid using a cyclising agent such as concentrated sulphuric acid; other suitable cyclising agents include polyphosphoric acid.

The terephthalic or isophthalic acid can itself be prepared by reduction of the substituted benzophenone III by treatment for example with elemental phosphorus and hydriodic acid in the presence of acetic acid.

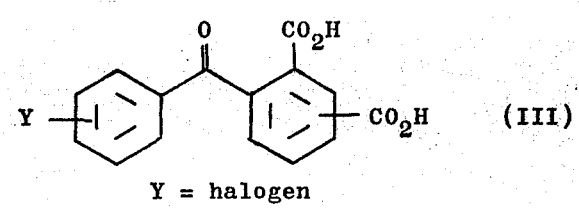

Y = halogen

The reaction IV–V is an example of this. The preparation of the compounds according to the invention can therefore be illustrated for example with reference to the production of the 7-fluoro compound VII as follows:

Z. Z. Moiseeva and S. N. Burenko, Zhur Obshchei. Khim, 31, 3985 1961; C. A. 57, 8516.) incorporated the cyclisation of the appropriate halo-substituted benzophenone diacid in fuming sulphuric acid.

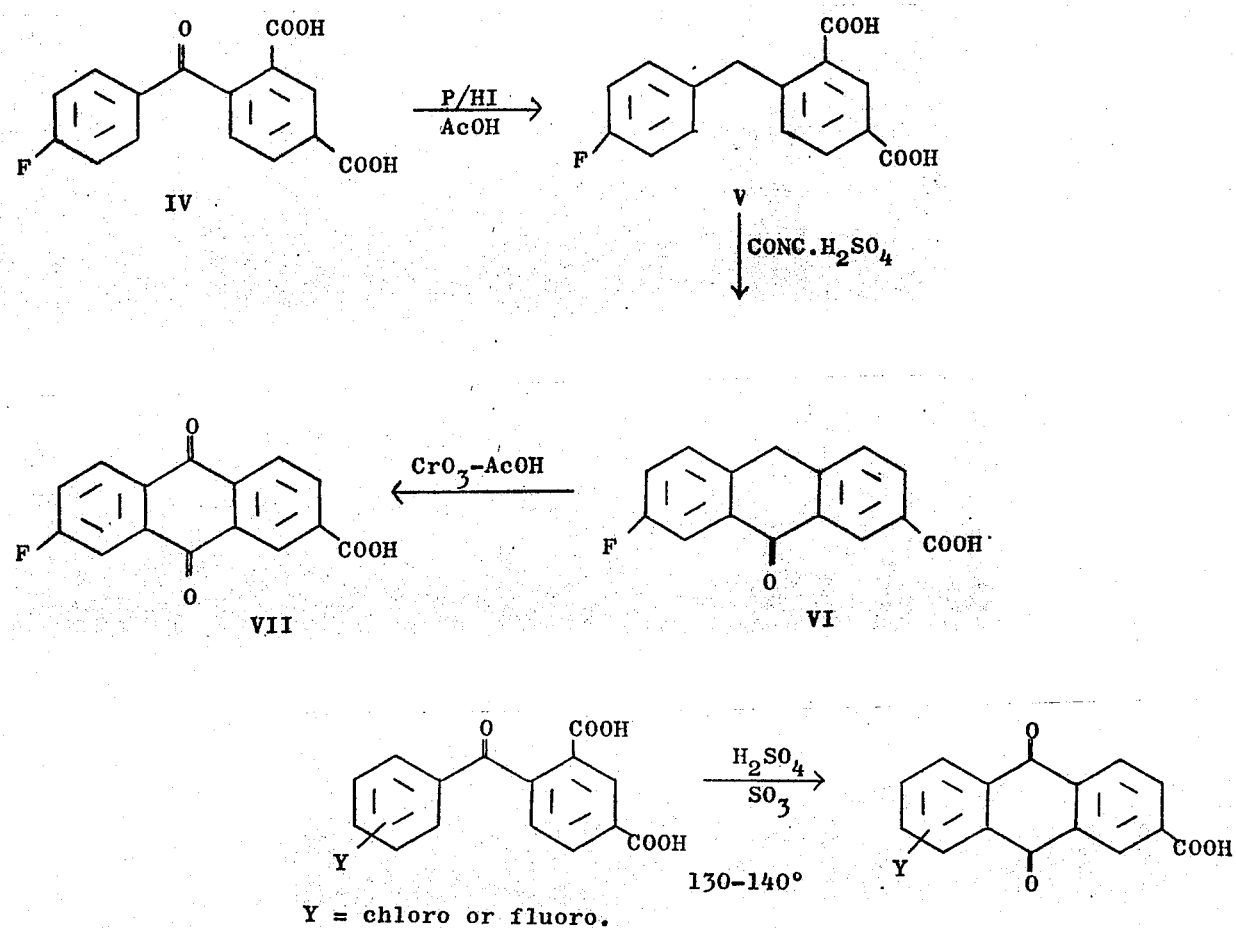

This is an unambiguous synthesis which does not provide for the possibility of isomerism and makes possible the production of pure isomers which has not hitherto been achieved.

The previous proposed synthesis (N.S. Dokunikhin, B. V. Salov and A. S. Glagoleva, Zhur ObshcheiKhim., 34 (3), 995, 1964; C. A. 60 15797, N. S. Dokunikhin, However, under these conditions we found that 4-fluorobenzophenone-2',4'- and 2,', 5'-dicarboxylic acids cyclised to the same product (m.p. 297°–300°), which is a mixture of the 6- and 7-fluoroanthraquinones. It appears to us that the isomers are probably formed by a rearrangement analogous to the Hayashi rearrangement of certain o-benzoylbenzoic acids,

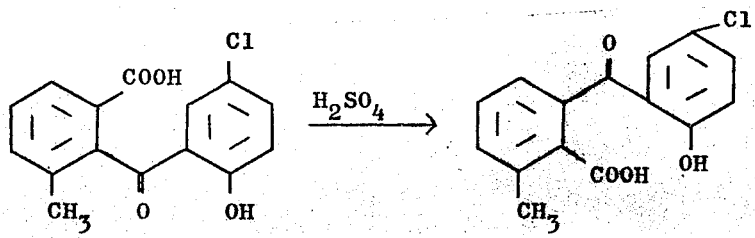

and that a spiro intermediate is involved in this type of reaction.

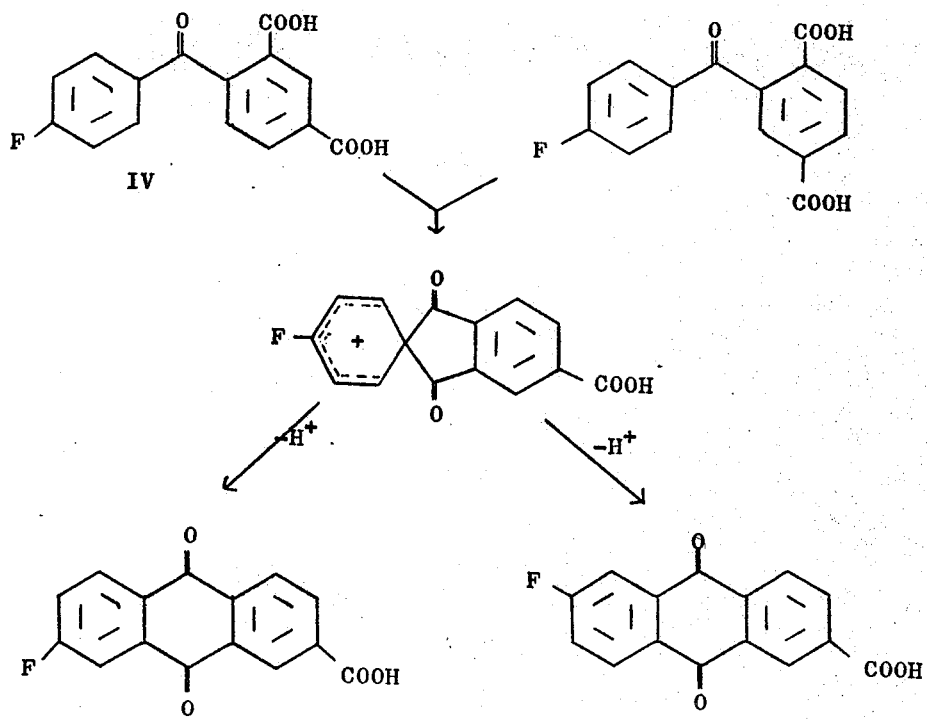

Similar behaviour was observed with the corresponding 4-chloro-benzophenone diacids and both 2-chlorobenzophenone-2', 4' and 2',5'-dicarboxylic acids cyclise to mixtures of the 5- and 8-chloro-9,10-dihydro-9,10-dioxo-2-anthroic acids.

By the process of the present invention as described we have been able to obtain the isomers separately. The m.p. values observed by us and those reported in the literature are set out below.

The infra-red spectra of the reported compounds have absorption bands of both pure isomers which is a further indication that the reported compounds are mixtures.

standard methods of chemistry described in the Examples.

It is understood that the conversion of any of the groups ($R_1$ = Hal) into the groups ($R_1$ = $-OR_2$, $-NR_3R_4$) can be effected at any convenient time in the above process.

The following Examples illustrate the invention:

EXAMPLE 1

2-(p-Fluorobenzyl)isophthalic acid 2-(p-Fluorobenzoyl)isophthalic acid) (2.5 g.), amorphous phosphorus (2.0 g.), hydriodic acid (1.5 ml.; 64–68%), water (1 ml.) and glacial acetic acid (50 ml.) were boiled under reflux for 4 hours. Phosphorus was

TABLE

| Source | 5-Cl | 6-Cl | 7-Cl | 8-Cl | 6-F | 7-F |
|---|---|---|---|---|---|---|
| Observed | 320 | 354–355.5 | 305–307 | 313–315 | 323–324 | 300–302 |
| Reported | 308–310 | 333.5–335 | 336–339 | 323–324 | 282–284 | 292–294 |

The compounds of general formula I wherein $R_1$ represents a halogen atom, particularly a fluorine atom, as well as being intrinsically active in the PCA test are valuable intermediates for the preparation of the compounds of the invention where $R_1$ is hydroxyl or the groups $-OR_2$ or $-NR_3R_4$.

The haloanthraquinone is treated for example with an amine $R_3R_4NH$ or an alkoxide $R_2OM$ where M is an alkali-metal, for example such as sodium.

This reaction is best carried out in a solvent, for example dimethylformamide, at an elevated temperature (50°–100°C). Compounds according to the invention in which $R_1$ is OH may be prepared from compounds in which $R_1$ is $-OR_2$ by standard reactions such as heating under reflux with hydrogen bromide in acetic acid.

Esters of the carboxyl group may be prepared by filtered off and the filtrate was decolourised with sodium metabisulphite and diluted with water. The diacid was collected, dried and recrystallised from aqueous ethanol, mp 234°–237° (1.9 g).

By a similar procedure 2-(4-fluorobenzoyl)terephthalic acid gave 2-(4-fluorobenzyl)terephthalic acid, mp 293°–297°; 2-(o-chloro-benzoyl)isophthalic acid gave 2-(p-chlorobenzyl)terephthalic acid, mp 285°–287°; 2-(p-chlorobenzoyl)isophthalic acid gave 2-(p-chlorobenzyl)isophthalic acid, mp 225°–229°; 2-(o-chlorobenzoyl)terephthalic acid gave 2-(o-chlorobenzyl)terephthalic acid, mp 316°–320°.

EXAMPLE 2

7-Fluoro-9,10-dihydro-9,10-dioxo-2-anthroic acid
2-(p-Fluorobenzyl)isophthalic acid (1.0 g.) in concentrated sulphuric acid (5 ml.) was kept for 3 hours at room temperature and then poured into water (25 ml.). The fluoroanthrone was collected, dried and suspended in glacial acetic acid (100 ml.). Chromic oxide (0.5 g.) was added and the mixture was stirred at 90° for 30 minutes, filtered, cooled and poured into water. The pale yellow solid was collected, dried and recrystallised from dioxanacetic acid, mp 300°–302° (0.5 g).

By a similar procedure 2-(p-chlorobenzyl)isophthalic acid gave 5-chloro-9,10-dihydro-9,10-dioxo-2-anthroic acid, mp 320° (dec.); 2-(p-chlorobenzyl)terephthalic acid gave 6-chloro-9,10-dihydro-9,10-dioxo-2-anthroic acid, mp 354°–355.5°; 2-(p-chlorobenzyl)isophthalic acid gave 7-chloro-9,10-dihydro-9,10-dioxo-2-anthroic acid, mp 305°–307°; 2-(o-chlorobenzyl)terephthalic acid gave 8-chloro-9,10-dihydro-9,10-dioxo-2-anthroic acid, mp 313°–315°; and 2-(4-fluorobenzyl)terephthalic acid gave 6-fluoro-9,10-dihydro-9,10-dioxo-2-anthroic acid, mp 321°–324°.

EXAMPLE 3

9,10-Dihydro-8-methoxy-9,10-dioxo-2-anthroic acid

8-Chloro-9,10-dihydro-9,10-dioxo-2-anthroic acid (0.8 g.) in dimethylformamide (100 ml.) containing a 1N solution of sodium in dry methanol (11 ml.) was stirred at 90° for 3 hours. The mixture was cooled, poured into 2N hydrochloric acid (150 ml.) and extracted with ethyl acetate. The extracts were evaporated to give a yellow solid which was crystallised from acetic acid, 0.4 g., mp 305°–310°.

EXAMPLE 4

9,10-Dihydro-7-methoxy-9,10-dioxo-2-anthroic acid and dimethylaminoethanol salt

7-Fluoro-9,10-dihydro-9,10-dioxo-2-anthroic acid (1 g.) in dimethylformamide (100 ml.) containing a 0.9N solution of sodium methoxide in dry methanol (13 ml.) was stirred at 90° for 30 minutes. It was cooled, poured into 2N hydrochloric acid, and the precipitated solid was filtered off and crystallised from galcial acetic acid to give a yellow solid (0.95 g.) mp 272.5°–275.5°. The acid (0.9 g) was dissolved in warm dimethylaminoethanol (10 ml.), cooled and diluted with ether to give the 2-dimethylaminoethanol salt as a yellow solid mp 176°–179°.

In a similar manner were prepared: 9,10-dihydro-6-methoxy-9,10-dioxo-2-anthroic acid, mp 311.5°–314°. 2-Dimethylaminoethanol salt mp 237°–239°. 9,10-Dihydro-7-propoxy-9,10-dioxo-2-anthroic acid, mp 267°–270°.

EXAMPLE 5

9,10-Dihydro-7-(2-hydroxyethoxy)-9,10-dioxo-2-anthroic acid

Sodium (0.5 g) was dissolved in ethane-1,2-diol (20 ml.) and added to a solution of 7-fluoro-9,10-dihydro-9,10-dioxo-2-anthroic acid (1 g.) in dimethylformamide (100 ml.). The mixture was heated at 100° for 1 hour, cooled, poured into 2N hydrochloric acid (150 ml.) and the precipitated solid extracted into ethyl acetate. The extracts were evaporated to give a yellow solid which was crystallised from ethyl acetate mp 255°–257°.

In a similar manner were prepared: 9,10-dihydro-7-(3-hydroxypropoxy)-9,10-dioxo-2-anthroic acid, mp 231°–234°.

9,10-Dihydro-7-(2-methoxyethoxy)9,10-dioxo-2-anthroic acid, mp 227°–229°.

7-(2-Dimethylaminoethoxy)-9,10-dihydro-9,10-dioxo-2-anthroic acid, hydrochloride, mp 276°–277°.

9,10-Dihydro-7-(phenethyloxy)-9,10-dioxo-2-anthroic acid mp 229.5°–232.5°.

9,10-Dihydro-9,10-dioxo-7-(2-phenoxyethoxy)-2-anthroic acid, mp 224°–225.5°.

9,10-Dihydro-6-(2-hydroxyethoxy)-9,10-dioxo-2-anthroic acid, mp 266°–270°. 2-Dimethylaminoethanol salt, mp 209°–211°.

9,10-Dihydro-6-(3-hydroxypropoxy)-9,10-dioxo-2-anthroic acid, mp 210°–214°. 2-Dimethylaminoethanol salt, mp 161°–3°.

EXAMPLE 6

9,10-Dihydro-7-morpholino-9,10-dioxo-2-anthroic acid

7-Fluoro-9,10-dihydro-9,10-dioxo-2-anthroic acid (1 g.), morpholine (2 g.) in dimethylformamide (100 ml.) were heated at 100° for 2 hours. The mixture was cooled and poured into 2N hydrochloric acid (150 ml.). The precipitated red solid was filtered off (0.9 g.) mp 311°–314°.

In a similar manner were prepared: 9,10-Dihydro-7-piperidino-9,10-dioxo-2-anthroic acid, mp 296°–297°. 2-Dimethylaminoethanol salt, mp 280°.

9,10-Dihydro-6-morpholino-9,10-dioxo-2-anthroic acid, mp 312°–315°.

9,10-Dihydro-7-(4-methyl-1-piperazinyl)-9,10-dioxo-2-anthroic acid, m.p. 271°(dec.). Hydrochloride, mp 339° C (dec.).

9,10-Dihydro-7-(2,6-dimethylmorpholino)-9,10-dioxo-2-anthroic acid, mp 323°–325°.

9,10-Dihydro-7-dimethylamino-9,10-dioxo-2-anthroic acid, mp 355°–357°.

9,10-Dihydro-6-piperidino-9,10-dioxo-2-anthroic acid, mp 284°–287°.

EXAMPLE 7

9,10-Dihydro-5-morpholino-9,10-dioxo-2-anthroic acid

A solution of 5-chloro-9,10-dihydro-9,10-dioxo-2-anthroic acid (0.4 g.) in morpholine (15 ml.) was heated at 100° for 4 hours. Solid separated during this period. The mixture was diluted with water and acidified; the required acid separated as a red solid (0.4 g). Recrystallisation from dimethylformamide and acetic acid gave a mauve solid, mp. 230°–232° (0.25 g).

In a similar manner was prepared: 9,10-Dihydro-7-[bis-(2-hydroxyethyl)amino]-9,10-dioxo-2-anthroic acid, mp 239°–241°.

EXAMPLE 8

9,10-Dihydro-7-(4-methyl-1-piperazinyl)-9,10-dioxo-2-anthroic acid, 2,2-dimethyl-1,3-dioxolanemethyl ester 9,10-Dihydro-7-fluoro-9,10-dioxo-2-anthroyl chloride (1.5 g), 2,2-dimethyl-1,3-dioxolanemethanol (0.76 g.) (P. E. Verkade et al., Rec. trav. chim., 55 267 (1936)), triethylamine (0.66 g) in methylene chloride (60 ml.) was stirred at room temperature for 2¼ hours. The solvent was removed to give a solid which was washed well with water and crystallised from aqeuous ethanol to give 9,10-dihydro-7-fluoro-9,10-dioxo-2-anthroic acid, 2,2-dimethyl-1,3-dioxolanemethyl ester (1.6 g.), mp. 127.5°–129.5°.

The above ester (1.5 g) and N-methylpiperazine (2.43 g) in N-methyl-2-pyrrolidone (150 ml.) was stirred at 100° for 35 minutes. The mixture was cooled, poured onto ice and the precipitated red solid filtered off and recrystallised twice from ethyl acetate to give the product (0.8 g), mp 164°–166.5°.

In a similar manner was prepared: 9,10-Dihydro-7-morpholino-9,10-dioxo-2-anthroic acid, 2,2-dimethyl-1,3-dioxolanemethyl ester, mp 187.5°–188.5°.

EXAMPLE 9

9,10-Dihydro-7-(4-methyl-1-piperazinyl)-9,10-dioxo-2-anthroic acid, 2,3-dihydroxypropyl ester, hydrochloride 9,10-Dihydro-7-(4-methyl-1-piperazinyl)-9,10-dioxo-2-anthroic acid, 2,2-dimethyl-1,3-dioxolane methyl ester (0.5 g.) in 25% aqueous acetic acid (25 ml.) was heated at 100° for 3 hours. The solvent was removed in vacuo, the resulting red solid dissolved in ethyl acetate and the hydrochloride precipitated by the addition of ethyl acetate containing 10% of hydrogen chloride. The hydrochloride was crystallised twice from aqueous acetone to give the product (0.15 g) mp 258°–259°.

In a similar manner was prepared (omitting the addition of hydrochloric acid): 9,10-Dihydro-7-morpholino-9,10-dioxo-2-anthroic acid, 2,3-dihydroxypropyl ester, mp 247°–249.5°.

EXAMPLE 10

9,10-Dihydro-7-fluoro-9,10-dioxo-2-anthroic acid, pivaloyloxymethyl ester and hydroxymethyl ester 9,10-Dihydro-7-fluoro-9,10-dioxo-2-anthroic acid (1.0 g.), chloromethylpivalate (1.11 g.) (M. Rasmussen et al., J. Amer. Chem. Soc., 89 5442 (1967), sodium hydride (0.178 g) (50% dispersion in oil) in N-methyl-2-pyrrolidone (100 ml.) was stirred at 100° for 50 minutes. It was cooled, poured onto ice and extracted with ethyl acetate. The extracts were concentrated to small volume, diluted with a little water and cooled. The precipitated solid was filtered off and crystallised from a mixture of chloroform and light petroleum (b.p. 60°–80°) to give the hydroxymethyl ester (0.4 g.), mp 228°–228.5° (with softening at 212°). Evaporation of the mother liquors from this crystallisation afforded a second compound which was recrystallised from ethanol to give the pivaloyloxymethyl ester (0.7 g.), mp 113.5°–115.5°.

EXAMPLE 11

9,10-Dihydro-7-morpholino-9,10-dioxo-2-anthroic acid, pivaloyloxymethyl ester 9,10-Dihydro-7-fluoro-9,10-dioxo-2-anthroic acid, pivaloyloxymethyl ester (0.5 g), morpholine (0.7 g.) in N-methyl-2-pyrrolidone (50 ml.) was stirred at 100° for 1 hour. It was cooled, poured onto ice and the precipitated solid crystallised from a mixture of chloroform and light petroleum ether (b.p. 60°–80°) to give the ester (0.4 g.), mp 175°–177.5°.

In a similar manner were prepared: 9,10-Dihydro-7-(4-methyl-1-piperazinyl)-9,10-dioxo-2-anthroic acid, pivaloyloxymethylester, hydrochloride, mp >350° with softening at 260°–270°.

9,10-Dihydro-7-(4-methyl-1-piperazinyl)-9,10-dioxo-2-anthroic acid, hydroxymethyl ester, hydrochloride, mp 312° with decomposition.

The hydrochlorides were prepared by the procedure described in Example 9.

What is claimed is:

1. An anthraquinone of the formula:

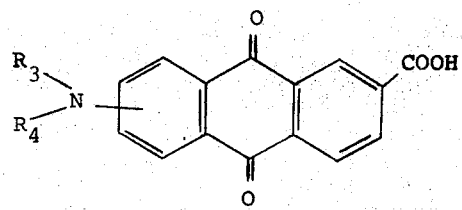

wherein $R_3$ and $R_4$ are hydrogen, lower alkyl from 1 to 6 carbon atoms, hydroxyethyl or $R_3$ and $R_4$, together with the nitrogen atom, form a morpholino, piperidino, N-methylpiperazino or 2,6-dimethylmorpholino group; or a pharmaceutically acceptable salt thereof.

2. The compound of claim 1 which is 9,10-Dihydro-7-morpholino-9,10-dioxo-2-anthroic acid.

3. The compound of claim 1 which is 9,10-Dihydro-7-piperidino-9,10-dioxo-2-anthroic acid.

4. The dimethylaminoethanol salt of the compound of claim 3.

5. The compound of claim 1 which is 9,10-Dihydro-6-morpholino-9,10-dioxo-2-anthroic acid.

6. The compound of claim 1 which is 9,10-Dihydro-7-(4-methyl-1-piperazinyl)-9,10-dioxo-2-anthroic acid.

7. The hydrochloride of the compound of claim 6.

8. The compound of claim 1 which is 9,10-Dihydro-7-(2,6-dimethylmorpholino)-9,10-dioxo-2-anthroic acid.

9. The compound of claim 1 which is 9,10-Dihydro-7-dimethylamino-9,10-dioxo-2-anthroic acid.

10. The compound of claim 1 which is 9,10-Dihydro-6-piperidino-9,10-dioxo-2-anthroic acid.

11. The compound of claim 1 which is 9,10-Dihydro-5-morpholino-9,10-dioxo-2-anthroic acid.

12. The compound of claim 1 which is 9,10-Dihydro-7-[bis-(2hydroxyethyl)amino]-9,10-dioxo-2-anthroic acid.

* * * * *